United States Patent
Livshin

(10) Patent No.: US 6,501,790 B1
(45) Date of Patent: Dec. 31, 2002

(54) METHOD AND APPARATUS FOR PROVIDING HIGH SPEED MODEM REPLAY USING LOCALLY CONNECTING MODEMS

(75) Inventor: Edward A. Livshin, Watertown, MA (US)

(73) Assignee: NMS Communications Corporation, Framingham, MA (US)

( * ) Notice: Subject to any disclaimer, the term of this patent is extended or adjusted under 35 U.S.C. 154(b) by 0 days.

(21) Appl. No.: 09/351,401

(22) Filed: Jul. 9, 1999

(51) Int. Cl.⁷ ................................................. H04L 5/16
(52) U.S. Cl. ....................... 375/222; 375/220
(58) Field of Search ................. 375/219, 220, 375/222; 455/557, 517, 507, 39, 73, 103; 370/276, 278, 282, 293; 379/92.03, 92.04, 100.01, 100.06, 100.12, 102.01, 219; 358/468

(56) References Cited

U.S. PATENT DOCUMENTS

| | | | | |
|---|---|---|---|---|
| 5,491,565 A | * | 2/1996 | Naper | 358/468 |
| 6,055,245 A | * | 4/2000 | Mitchell et al. | 370/493 |
| 6,075,797 A | * | 6/2000 | Thomas | 370/310 |
| 6,144,464 A | * | 11/2000 | Rupp et al. | 358/442 |
| 6,161,201 A | * | 12/2000 | Payne et al. | 340/853.2 |
| 6,201,976 B1 | * | 3/2001 | Räsänen | 455/557 |
| 6,373,889 B1 | * | 4/2002 | Alelyunas et al. | 375/233 |
| 6,404,738 B1 | * | 6/2002 | Reininger et al. | 370/236 |

OTHER PUBLICATIONS

International Telegraph and Telephone Consultative Committee, Recommendation V.32 bis. *A Duplex Modem Operating At Data Signalling Rates of Up To 14 400 bit/s for Use On The General Switched Telephone Network and On Leased Point–to–Point 2–Wire Telephone–Type Circuits*, (Geneva, 1991).

* cited by examiner

*Primary Examiner*—Chi Pham
*Assistant Examiner*—Emmanuel Bayard
(74) *Attorney, Agent, or Firm*—Mintz, Levin, Cohn, Ferris, Glovsky & Popeo, P.C.

(57) ABSTRACT

Methods and apparatus for providing data communication between modems coupled over digital channels are provided. In one aspect, the present invention features an apparatus used in a system for providing communication over a digital channel to couple a first modem on a first network to a second modem on a second network. The apparatus includes a modem module that couples to the first modem at a data rate determined in part by a modulation rate of the modem module. The apparatus further includes a digital channel interface module coupled to the modem module, the digital channel interface module including a buffer that receives data from the digital channel and provides data to the modem module. The apparatus also includes a control circuit that detects a level of data in the buffer and modifies the modulation rate of the modem module based on the level of data detected.

24 Claims, 8 Drawing Sheets

METHOD AND APPARATUS FOR PROVIDING HIGH SPEED MODEM REPLAY USING LOCALLY CONNECTING MODEMS

COPYRIGHT NOTICE

Copyright 1997 ViaDSP, Inc. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

FIELD OF THE INVENTION

The present invention relates generally to an apparatus and method for providing communication between modems over digital networks, and more specifically, the present invention is directed to methods and apparatus for providing high speed modem relay using locally connecting modems.

BACKGROUND OF THE INVENTION

A number of standards exist for defining communication protocols between modems coupled together for communication over the Public Switched Telephone Network (PSTN) or for communication over dedicated lines. For example, these standards include the V.34, V.32, and V.32bis standards among other standards promulgated by the International Telecommunications Union (ITU). A number of problems arise when modems implementing one of the above standards, or some similar standard, are coupled together over a digital link as shown in FIG. 1 and described below.

FIG. 1 shows a communication system 10 for providing full-duplex communication between modems 12 and 14. The communication system includes, in addition to modems 12 and 14, a first PSTN 16, a second PSTN 18, a first switch 20, a second switch 22, and a digital channel 24 connecting the first switch to the second switch. As understood by those skilled in the art, either or both of the PSTNs 16 and 18 could be replaced by dedicated lines. The digital channel may be implemented in one of a number of different ways such as through packet switched or synchronous transmission networks examples of which are the internet and a private satellite network respectively. Each of the first switch 20 and the second switch 22 includes a modem, which may be similar to modems 12 and 14. The use of the modems in the switches minimizes the bandwidth needed to pass data over the digital network. In addition, each of the switches includes circuitry for coupling to the digital channel 24.

Several problems arise when attempting to use standard high-speed modems as the modems 12 and 14 in the communication system 10. These problems are due primarily to the relatively long network dependent propagation delays between switches 20 and 22, which make it difficult for the system to support features of high speed modems defined in the V.34 and V.32bis standards. These features include: automoding, a feature which allows a high-speed modem, to recognize and communicate with a "slower" modem such as a V.22 or V.22bis modem; and "training", including retraining, and "rate negotiation", including renegotiation, which allow connected modems to train their equalizers and dynamically alter the data rate between the modems (while in data phase) based on continuous analysis of line conditions.

Another problem that can arise when using high speed modems in the communication system 10 is that differences in clock speeds may result in unacceptable bit error rates. For example, typical modem standards require that the clock offset of the clock signal used to transmit data be less than ±0.01% of the baud rate. If in the system 10, the clock rate for sending data from modem 12 is 0.01% faster than nominal and the corresponding clock rate within switch 22 is 0.01% slower than nominal, then there will be a periodic inherent data loss in the communication system. In some prior art systems, this clock problem is hidden by error correction protocols negotiated by the end modems 12 and 14 that enable retransmission of lost data. This solution, however, results in an undesirable reduction in the effective data rate between modem 12 and modem 14.

SUMMARY OF THE INVENTION

Embodiments of the present invention provide methods and apparatus that overcome the problems and drawbacks discussed above associated with operating modems over digital channels.

In one general aspect, the invention features an apparatus used in a system for providing communication over a digital channel to couple a first modem on a first network to a second modem on a second network. The apparatus includes a modem module that couples to the first modem over the first network. The modem module provides data to the first modem at a data rate determined in part by a modulation rate of the modem module. The apparatus further includes a digital channel interface module coupled to the modem module, the digital channel interface module including a buffer that receives data from the digital channel and provides data to the modem module, and a control circuit coupled to the buffer and the modem module, the control circuit being constructed and arranged to detect a level of data in the buffer and to modify the modulation rate of the modem module based on the level of data detected.

The digital channel can be coupled to a second apparatus, and the digital channel interface module can be constructed and arranged to communicate with the second apparatus over the digital channel. The modem module can be adapted to receive automoding signals from the first modem and to transfer the automoding signals to the digital channel interface module, and the digital channel interface module can be adapted to send data corresponding to the automoding signals to the second apparatus over the digital channel. The digital channel interface module can be adapted to receive automoding signals from the other apparatus over the digital channel and to transfer the automoding signals to the modem interface module, and the modem interface module can be adapted to send data corresponding to the automoding signals to the first modem. The modem interface module can be adapted to receive rate renegotiation signals from the first modem and to transfer the rate renegotiation signals to the digital channel interface module, and the digital channel interface module can be adapted to send data corresponding to the rate renegotiation signals to the second apparatus over the digital channel. The digital channel interface module can be adapted to receive rate renegotiation signals from the other apparatus over the digital channel and to transfer the rate renegotiation signals to the modem interface module, and the modem interface module can be adapted to send data corresponding to the rate renegotiation signals to the first modem. The first network can be a public switched telephone network, and the modem interface module can be constructed and arranged to communicate with the first modem over the public switched telephone network. The modem interface module can include modems of the type defined by V.34, V.32 and V.22 families of ITU specifications.

A second aspect of the present invention is directed to an apparatus used in a system for providing communication over a digital channel to couple a first modem on a first network to a second modem on a second network. The apparatus includes first means for operatively coupling to the first modem over the first network to provide a data signal having a data modulation rate to the first modem, second means for transmitting data to and for receiving data from the digital channel, data storage means for storing data received from the digital channel, and control means, coupled to the first means, the second means and the data storage means, for detecting a level of data in the data storage means and for modifying the modulation rate based on the level of data detected.

The first means can include means for receiving automoding signals from the first modem, and means for transferring the automoding signals to the second means, and the second means can include means for sending data corresponding to the automoding signals to a second apparatus over the digital channel. The second means can include means for receiving automoding signals from the second apparatus over the digital channel and means for transferring the automoding signals to the first means, and the first means can include means for sending data corresponding to the automoding signals to the first modem. The first means can include means for receiving rate renegotiation signals from the first modem and means for transferring the rate renegotiation signals to the second means, and the second means can include means for sending data corresponding to the rate renegotiation signals to the second apparatus over the digital channel. The second means can include means for receiving rate renegotiation signals from the second apparatus over the digital channel and means for transferring the rate renegotiation signals to the first means, and the first means can include means for sending data corresponding to the rate renegotiation signals to the first modem.

A third aspect of the present invention is directed to an apparatus used in a system for providing communication over a digital channel to couple a first modem on a first network to a second modem on a second network. The apparatus includes first means for operatively coupling to the first modem over the first network to provide a data signal having a data modulation rate to the first modem, second means for transmitting data to and for receiving data from the digital channel, and control means, coupled to the first means, the second means and the data storage means, for controlling operation of the apparatus. The first means includes means for receiving automoding signals from the first modem, and means for transferring the automoding signals to the second means, and the second means includes means for sending data corresponding to the automoding signals to a second apparatus over the digital channel.

The second means of the third apparatus can include means for receiving automoding signals from the second apparatus over the digital channel and means for transferring the automoding signals to the first means, and the first means includes means for sending data corresponding to the automoding signals to the first modem. The first means can include means for receiving rate renegotiation signals from the first modem and means for transferring the rate renegotiation signals to the second means, and the second means can include means for sending data corresponding to the rate renegotiation signals to a second apparatus over the digital channel. The second means can include means for receiving rate renegotiation signals from the second apparatus over the digital channel and means for transferring the rate renegotiation signals to the first means, and the first means can include means for sending data corresponding to the rate renegotiation signals to the first modem.

A fourth aspect of the present invention is directed to an apparatus used in a system for providing communication over a digital channel to couple a first modem on a first network to a second modem on a second network. The apparatus of the fourth aspect includes first means for operatively coupling to the first modem over the first network to provide a data signal having a data modulation rate to the first modem, second means for transmitting data to and for receiving data from the digital channel, and control means, coupled to the first means, the second means and the data storage means, for controlling operation of the apparatus. The first means includes means for receiving rate renegotiation signals from the first modem and means for transferring the rate renegotiation signals to the second means, and the second means includes means for sending data corresponding to the rate renegotiation signals to a second apparatus over the digital channel.

The second means can include means for receiving rate renegotiation signals from the second apparatus over the digital channel and means for transferring the rate renegotiation signals to the first means, and the first means can include means for sending data corresponding to the rate renegotiation signals to the first modem.

A fifth aspect of the present invention is directed to a method for transmitting data between a first modem and a second modem over a digital channel using first and second switches coupled to the digital channel. The method includes steps of establishing a first connection between the first modem and the first switch, establishing a second connection between the second modem and the second switch, transmitting data from the first modem to the second modem through the first switch, the digital channel and the second switch, monitoring a level of data in a buffer in the second switch, and varying a modulation rate of data transmitted from the second switch to the second modem based on the level of data detected in the buffer.

A sixth aspect of the present invention is directed to a method for establishing data transmission between a first modem and a second modem over a transmission path that includes a first switch, a second switch, a digital channel coupled between the first switch and the second switch, a first network coupled between the first modem and the first switch and a second network coupled between the second switch and the second modem. The method includes steps of transmitting a first automoding signal in accordance with a predefined protocol from the second modem to the second switch, transmitting a signal representative of the first automoding signal from the second switch to the first switch over the digital channel, and transmitting the first automoding signal from the first switch to the first modem. The first automoding signal includes data representative of data transmission modes supported by the second modem.

The method can further include a step of transmitting a second automoding signal from the first modem to the first switch, wherein the second automoding signal includes data representative of data transmission modes supported by the first modem. The method can further include a step of transmitting data between the first modem and the second modem over the transmission path using a data transmission mode identified by both the first automoding signal and the second automoding signal. The method can further include steps of transmitting a first rate renegotiation signal from the first modem to the second modem over the transmission path, and performing a rate renegotiation process to establish a transmission data rate for data transmission between the first modem and the second modem.

BRIEF DESCRIPTION OF THE DRAWINGS

For a better understanding of the present invention, reference is made to the drawings which are incorporated herein by reference and in which.

DETAILED DESCRIPTION

In illustrative embodiments of the present invention, the problems described above associated with high speed modem relays are overcome in systems that utilize modems that comply with the V.32bis standard as well as modems that comply with the V.32, V.22, and V.22bis standards. As readily understood by one skilled in the art, embodiments of the present invention are not limited to V.22 and V.32 modems and are extendable to modems that comply with the V.34 standard, other standards, or modems that do not comply with any standards.

Figure 2:
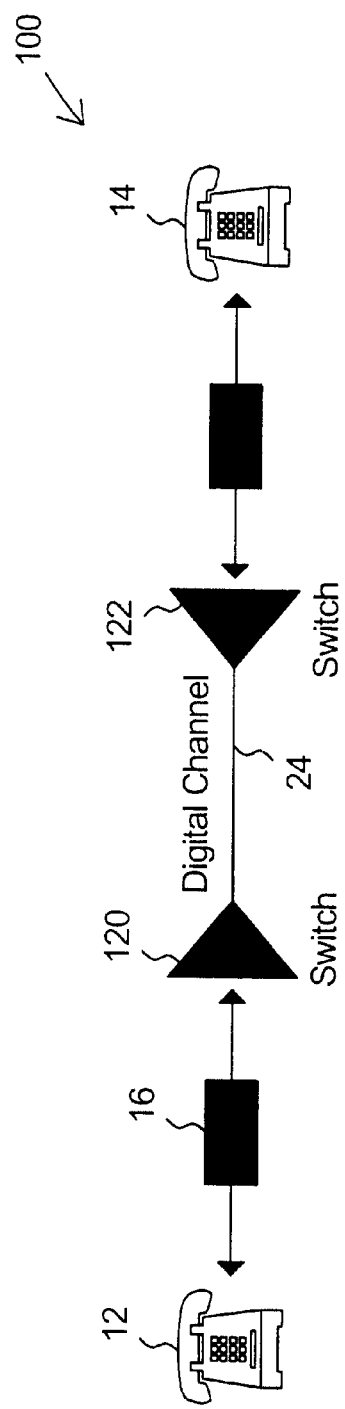
FIG. 2 is a block diagram of a communication system in accordance with one embodiment of the present invention.

FIG. 2 shows a communication system 100 that is similar to communication system 10 for providing full duplex communication between modems 12 and 14. Communication system 100 differs from communication system 10 in that additional functionality has been provided in switches 120 and 122 of the communication system 100 to overcome the problems of communication system 10 discussed above. In one embodiment of the present invention, the additional functionality in switches 120 and 122 is provided by software contained in each of the switches 120 and 122. However, as understood by those skilled in the art, the functionality may be provided using a combination of additional hardware and software, or may be implemented using additional hardware only. In addition, although each of the switches are shown within one housing, in other embodiments, the functionality provided by the switches could be divided among two or more housings or units. The attached appendix, includes software code written in C that implements modem relay controls functionality provided by embodiments of the present invention directed to all aspects of modem connect protocol including automoding features. In embodiments of the present invention, the prior art switches 20 and 22 have been upgraded to include the software code of Appendix A.

In one embodiment of the present invention, the problem described above regarding clock offset differences leading to either data loss or a reduction in the effective data rate of the communication system is overcome, as will now be described. For this embodiment, in the communication system 100, the digital channel 24 is implemented using a digital channel having a bandwidth that is greater than the highest data rate used by the modems 12 and 14 by at least 0.01% plus any overhead required for operating the digital channel. In addition, data modulators contained in the modems in switches 120 and 122 have the flexibility to smoothly change their symbols/sample ratio (i.e., modulation rate) by ±0.02%, and data relay mechanisms in the switches 120 and 122 include a special protocol to send more or less data across the digital channel as required to accommodate variations in the clock signals. In embodiments of the present invention, the data modulation rate of the modems in the switches is varied to accommodate differences in clock signals.

Figure 3:
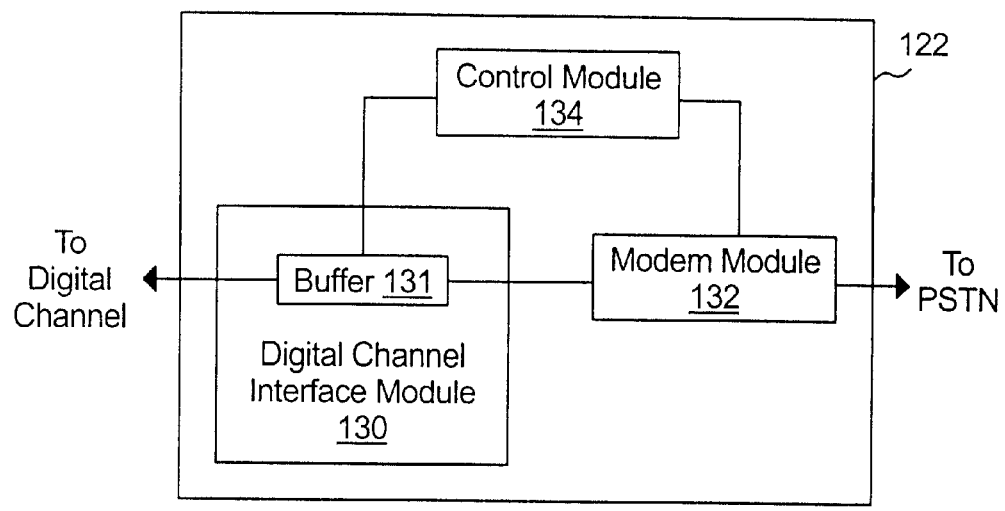
FIG. 3 is a block diagram of a switch used in the communication system of FIG. 2.

A simplified functional block diagram of the switch 122 is shown in FIG. 3. The switch 122 includes a digital channel interface module 130 having a buffer 131, a modem module 132 and a control module 134 coupled to the buffer 131 and the modem module 132. In one embodiment, digital data received at switch 122 from switch 120 over the digital network 24 is received in buffer 131 of switch 122 and the digital data is passed from buffer 131 to the modem module 132. The modem module modulates a carrier signal using a modulation rate as is known in the art to impose the digital data on the carrier signal. The modem module 132 then transfers the modulated carrier signal to modem 14.

Figure 4:
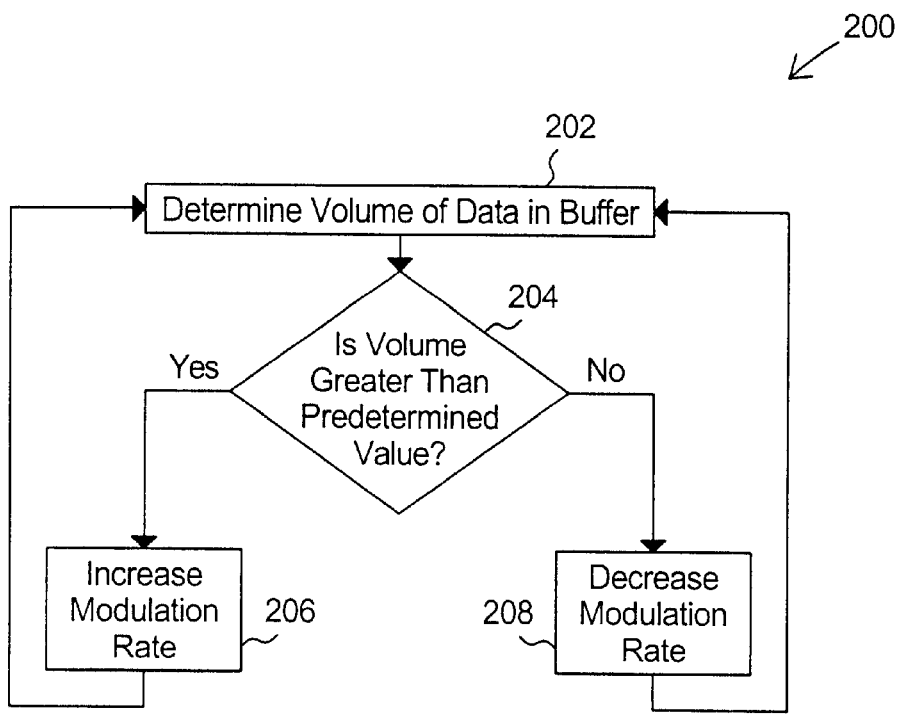
FIG. 4 is a flow chart of a process used in the communication system of FIG. 2 for modifying a modulation rate.

In embodiments of the present invention, the modulation rate of the modem module is varied in a closed loop feedback manner using control module 134 based on the volume of data contained in the buffer 131. A method 200 used by control module 134 to control the modulation rate is shown in flowchart form in FIG. 4 and will now be described. In a first step 202 of the method 200, the volume of data in the buffer 130 is determined, and in step 204, the volume of data is compared with a predetermined nominal value. If the volume of data in the buffer 131 is greater than the nominal value, then the modulation rate of the modulator is increased in step 206 to reduce the amount of data contained in the buffer 130. If the volume of data in the buffer is less than the nominal value, then the modulation rate of the modulator is decreased in step 208 to increase the amount of data in the buffer 130. The method then returns to step 202 to repeat the process.

In one embodiment of the present invention, the size of the buffer is 256 bits, the predetermined nominal value is 128 bits, and the modulation rate is varied by 0.02% when the volume of data in the buffer varies from the nominal value by 64 bits.

Switch 120 is substantially identical to switch 122 and operates in the same manner as switch 122 for data transfer from switch 122 to switch 120. The variable modulation scheme described above overcomes the problem of clock variability without losing data or lowering the effective data rate of the communications system. Variations in clock rates are accommodated by varying the modulation rate of the carrier signal from the modems in the switches.

In a second embodiment of the present invention, rather than using a feedback technique, the modulation rate of the switch 122 (and the modulation rate of the switch 120 for data transfer from switch 122 to switch 120) is set by switch 120 during protocol negotiation to set up the modulator. In this second embodiment, switch 120 determines its demodulation rate (which is equal to the modulation rate of the data it receives from modem 12) and sets the modulation rate of switch 122 via an inband message to be equal to the demodulation rate of switch 120. The technique of the second embodiment is effective as a first order approximation to the differences in clock rates as it does not compensate for clock drifts over time.

Figure 1:
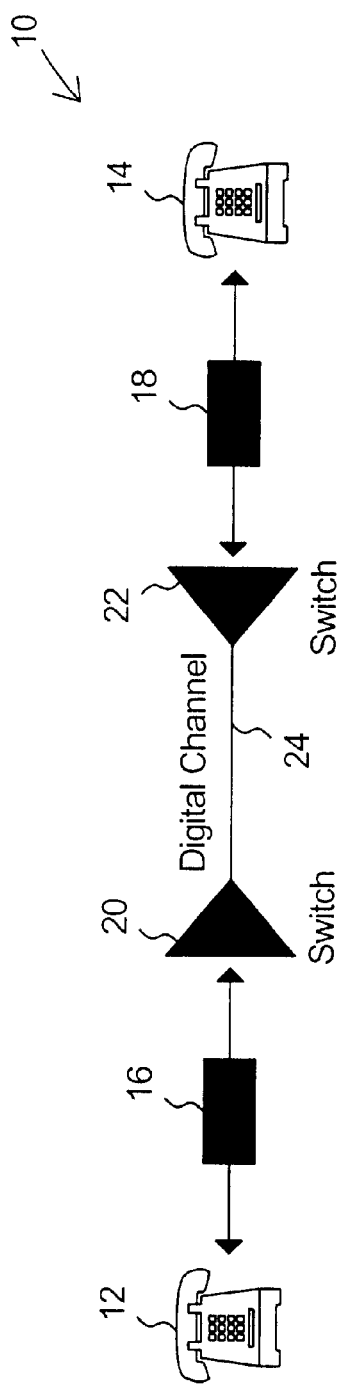
FIG. 1 is a block diagram of a communication system of the prior art.

The process by which embodiments of the present invention accomplish automoding in the communications system 100 will now be described. As described above, the V.32bis and V.34 modem standards provide a protocol for automoding to allow a high-speed modem, to recognize and communicate with a "slower" modem such as a V.22 or V.22bis modem or a facsimile machine. The standards are directed to modems coupled together through, for example, a PSTN connection or a dedicated line connection, and do not account for a digital network interposed between the modems as in communication systems 10 and 100 shown respectively in FIGS. 1 and 2.

Figure 5:
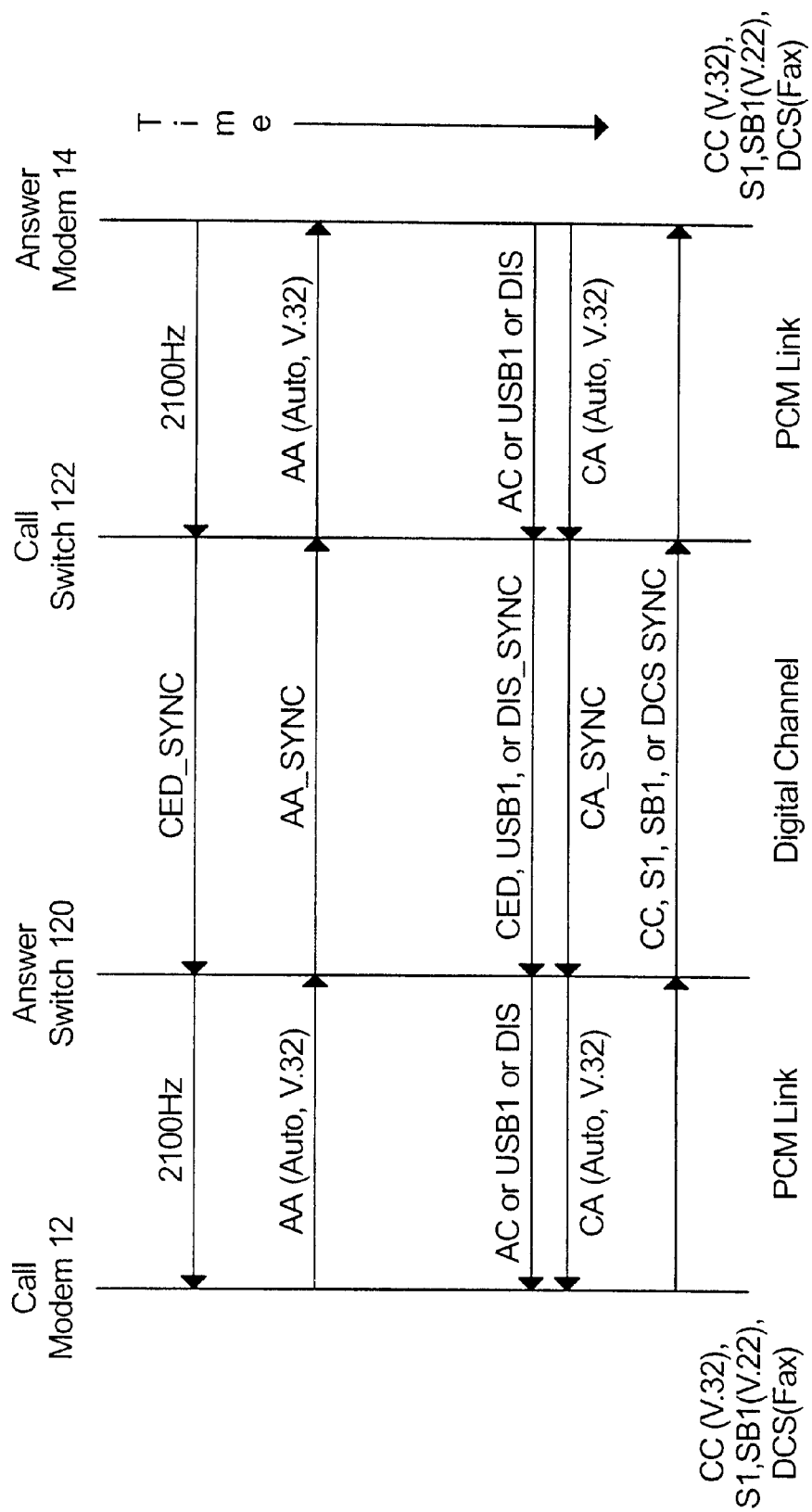
FIG. 5 is a timing diagram of control signals used in the communication system of FIG. 2 during an automoding process.
Figure 6:
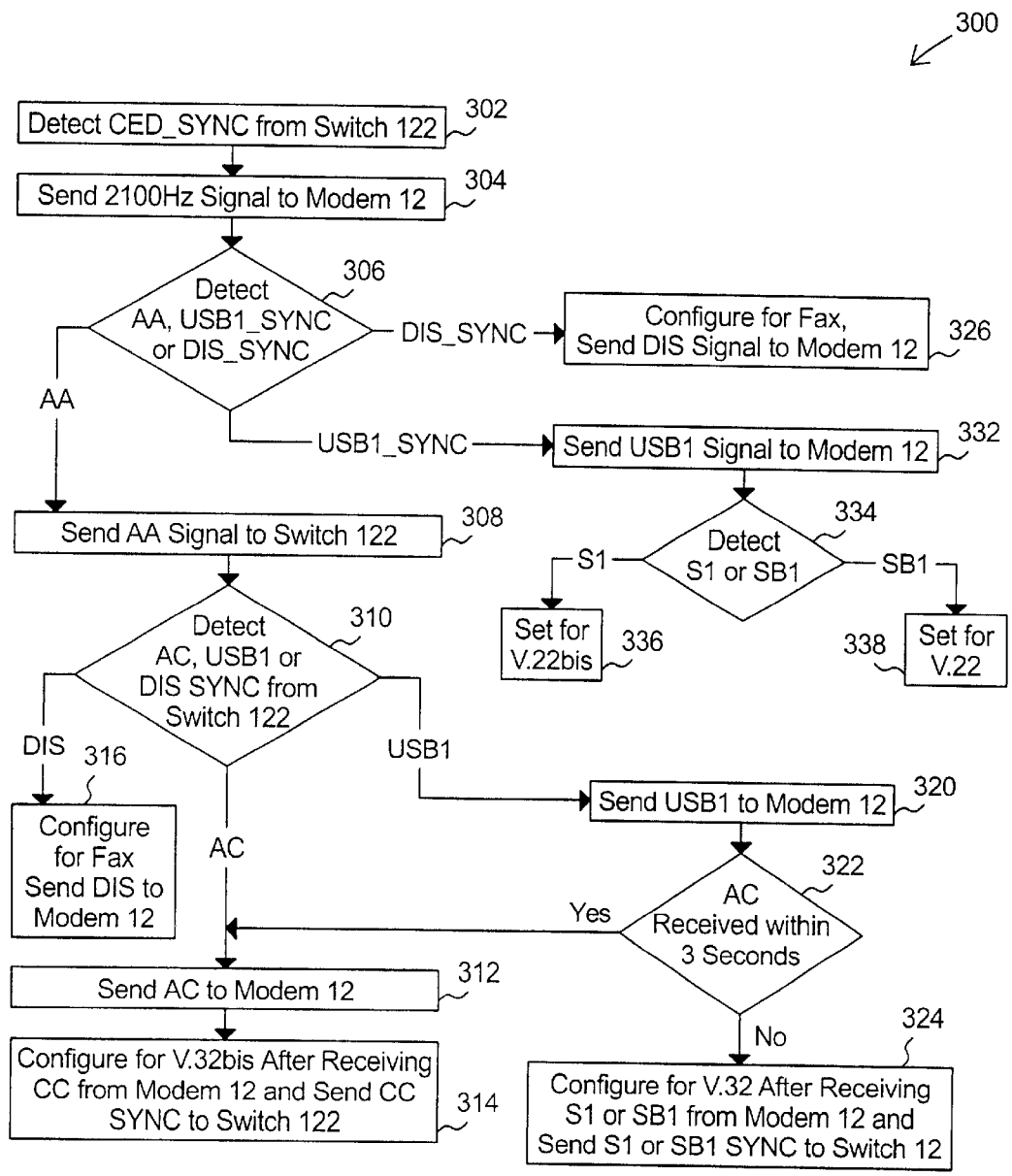
FIG. 6 is a flow chart of a process performed by a first switch in the communication system of FIG. 2 during the automoding process.
Figure 7:
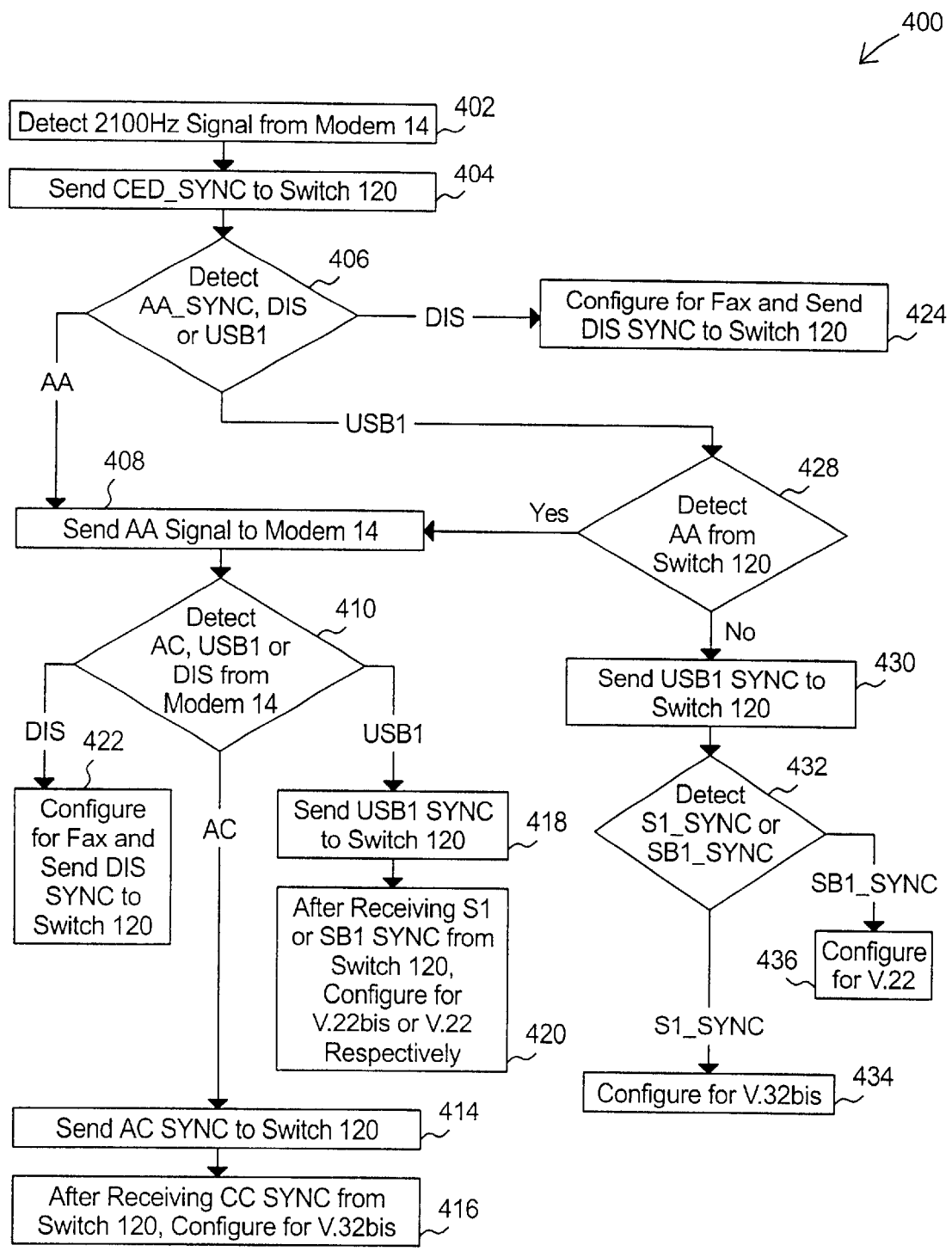
FIG. 7 is a flow chart of a process performed by a second switch in the communication system of FIG. 2 during the automoding process.

In embodiments of the present invention, to accommodate automoding in the communications system 100, control signals are transmitted between switches 120 and 122 in accordance with a protocol defined herein during a start-up procedure between modems 12 and 14 to allow modems 12 and 14 to accomplish automoding. This protocol will now be described with reference to FIGS. 5–7 for one example when a call is made from modem 12 to modem 14. As understood by those skilled in the art, the protocol can be used in a similar manner for calls originating from modem 14. FIG. 5 shows a sequence of signals transmitted between the modems 12, 14 and the switches 120, 122. FIG. 6 shows a flow chart of the process 300 performed by switch 120 during the automoding process, and FIG. 7 shows a flow chart of the process 400 performed by switch 122 during the automoding process.

As discussed above, each of the switches 120 and 122 includes a modem for communicating respectively with modems 12 and 14. In one embodiment of the present invention that accommodates automoding, the modems in switches 120 and 122 comply with the V.32 standard or a higher standard (i.e., V.32bis or V.34). When a call originating from modem 12 is answered at modem 14 (after having been transferred through digital channel 24 by switches 120 and 122), modem 14 sends a 2100 Hz tone answer tone. The 2100 Hz tone is received by the modem in switch 122 (step 402), and switch 122 sends a message CED_SYNC (step 404) to switch 120. The modem in switch 122 does not immediately provide a response to modem 14. When switch 120 receives the CED_SYNC message (step 302), the modem in switch 120 sends a 2100 Hz tone to modem 12 (step 304).

When modem 12 receives the 2100 Hz tone, if modem 12 is a V.32 or V.32bis modem, it will send a signal AA to switch 120. If modem 12 is not a V.32 or V.32bis modem, but rather is a V.22, V.22bis or facsimile machine, it will not respond to the 2100 Hz signal.

If switch 120 receives an AA signal from modem 12 (step 306), it will send a message AA_SYNC to switch 122 (step 308), causing switch 122 to send the AA signal to modem 12 (steps 406 and 408). Upon receipt of the AA signal, if received within 3.3±0.7 seconds (the duration of the answer tone), modem 14, depending on its modem type will respond with one of three signals including: a signal AC, if modem 14 is a V.32 or V.32bis modem; a USB1 signal, if modem 14 is a V.22 or V.22bis modem; and a DIS signal if modem 14 is a facsimile machine. If signal AA is not received during transmission of the answer tone by modem 14, then modem 14 will send a signal USB1, unless modem 14 is a facsimile machine in which case it will send signal DIS.

Modem 14 may in some instances due to, for example, delays in the digital channel, receive signal AA after sending signal USB1 or signal DIS. If the signal AA is received within 3.1 seconds of the transmission of signal USB1 by modem 14, modem 14 will still respond with the signal AC if modem 14 is a V.32 or V.32bis modem.

If modem 14 is a V.32 or V.32bis modem and modem 12 is also a V.32 or V.32bis modem, then in accordance with the V.32 specification, after sending signal AC, modem 14 will send signal CA, and upon receipt of signal CA, modem 12 will send signal CC. Modems 12 and 14 will have then completed the automoding protocol and proceed with training and rate negotiation.

In step 410 of process 400, after sending signal AA to modem 14, switch 122 will receive either AC, USB1 or DIS from modem 14. If signal AC is received by the modem in switch 122, then in step 414, a message AC_SYNC will be sent by switch 122 to switch 120 across the digital channel 24, and in step 416, after receiving message CC_SYNC from switch 120, the modem in switch 122 will be configured for V.32 or V.32bis.

If signal USB1 is received by the modem in switch 122 in step 410, then in step 418, switch 122 will send USB1_SYNC over the digital channel to switch 120. Switch 122 will then wait to receive message S1_SYNC or SB1_SYNC from switch 120 before configuring the modem in switch 122 for V.22bis or V.22 respectively in step 420.

If signal DIS is received by the modem in switch 122 in step 410, then in step 422, switch 122 will send a message DIS SYNC to switch 120 and configure the modem in switch 120 for facsimile communication.

If the AA signal is not received by switch 122 in step 406, then switch 122 should receive either signal USB1 or DIS from modem 14 in step 422. If switch 122 receives the DIS signal from modem 14, then in step 424, the message DIS_SYNC is sent from switch 122 to switch 120 and the modem in switch 122 is configured for facsimile communication.

If switch 122 receives the USB1 signal in step 422, then in step 428, switch 122 waits for a period of 3.1 seconds for a late AA signal from switch 120, and if the late AA signal is received, then the process proceeds to step 408. If a late AA signal is not received, then in step 430, a message USB1_SYNC is sent from switch 122 to switch 120. Switch 122 then waits to detect one of the messages S1_SYNC or SB1_SYNC from switch 120 in step 432. If S1_SYNC is detected in step 432, then in step 434, the modem in switch 122 is set for V.22bis. If SB1_SYNC is detected in step 432, than in step 436, the modem in switch 122 is set for V.22.

At switch 120, after sending signal AA, process 300, in step 310, will detect one of the messages AC_SYNC, USB1_SYNC, or DIS_SYNC sent by switch 122 over digital channel 24. If AC_SYNC is detected, then in step 312, switch 120 will send signal AC_to modem 12. In step 314 after switch 120 receives signal CC from modem 12, the modem in switch 120 is configured for V.32bis and message CC_SYNC is sent to switch 122.

If DIS_SYNC is detected in step 310, then in step 316, signal DIS is sent to modem 12, and the modem in switch 120 is set for facsimile communication.

If USB1_SYNC is detected in step 310, then in steps 320 and 322, switch 120 will wait for 3.1 seconds for detection of message AC_SYNC from switch 122 while sending USB1 to modem 12. AC_SYNC may arrive after USB1_SYNC if AA_SYNC is received by switch 120 after it has sent USB1_SYNC. If the outcome of step 320 is "YES", then process 300 proceeds with step 312. If the outcome of step 320 is "NO", then in step 324, after switch 120 receives signal S1 or SB1 from modem 12, the modem in switch 120 is configured for V.22bis, and message S1_SYNC or SB1_SYNC is sent to switch 122.

If signal AA was not detected by switch 120 from modem 10 in step 306, switch 120 will receive either USB1_SYNC or DIS_SYNC from switch 122. If DIS_SYNC is detected in step 306, then in step 326, signal DIS is sent to modem 12, and the modem in switch 120 is set for facsimile transmission.

If message USB1_SYNC is detected by switch 120 in step 306, then in step 332, signal USB1 is sent to modem 12. Next, in step 334, switch 120 will detect either S1 or SB1 from modem 12. If either S1 is detected in step 334, then in step 336, the modem in switch 120 is set for V.22bis, and if SB1 is detected in step 334, then the modem is set for V.22 is step 338.

The process and apparatus of embodiments of the present invention described above allow modems coupled through a digital channel to perform an automoding process such as that described in the V.32bis specification. The protocols used by modems 12 and 14 in the illustrative embodiment described above are defined in the V.32bis specification. Embodiments of the present invention provide processes and apparatus for configuring switches used in implementing the digital channel, including modems in the switches, and for defining communication protocols between the switches, so that the modems 12 and 14 can accomplish the automoding process across the digital channel. In illustrative embodiments described above, the modems 12 and 14 use the automoding protocol defined in the V.32bis specification, however, as understood by those skilled in the art, the present invention is not limited for use with V.32bis modems, but rather, can be used with other modems such as V.34 modems and V.90 modems.

Figure 8:
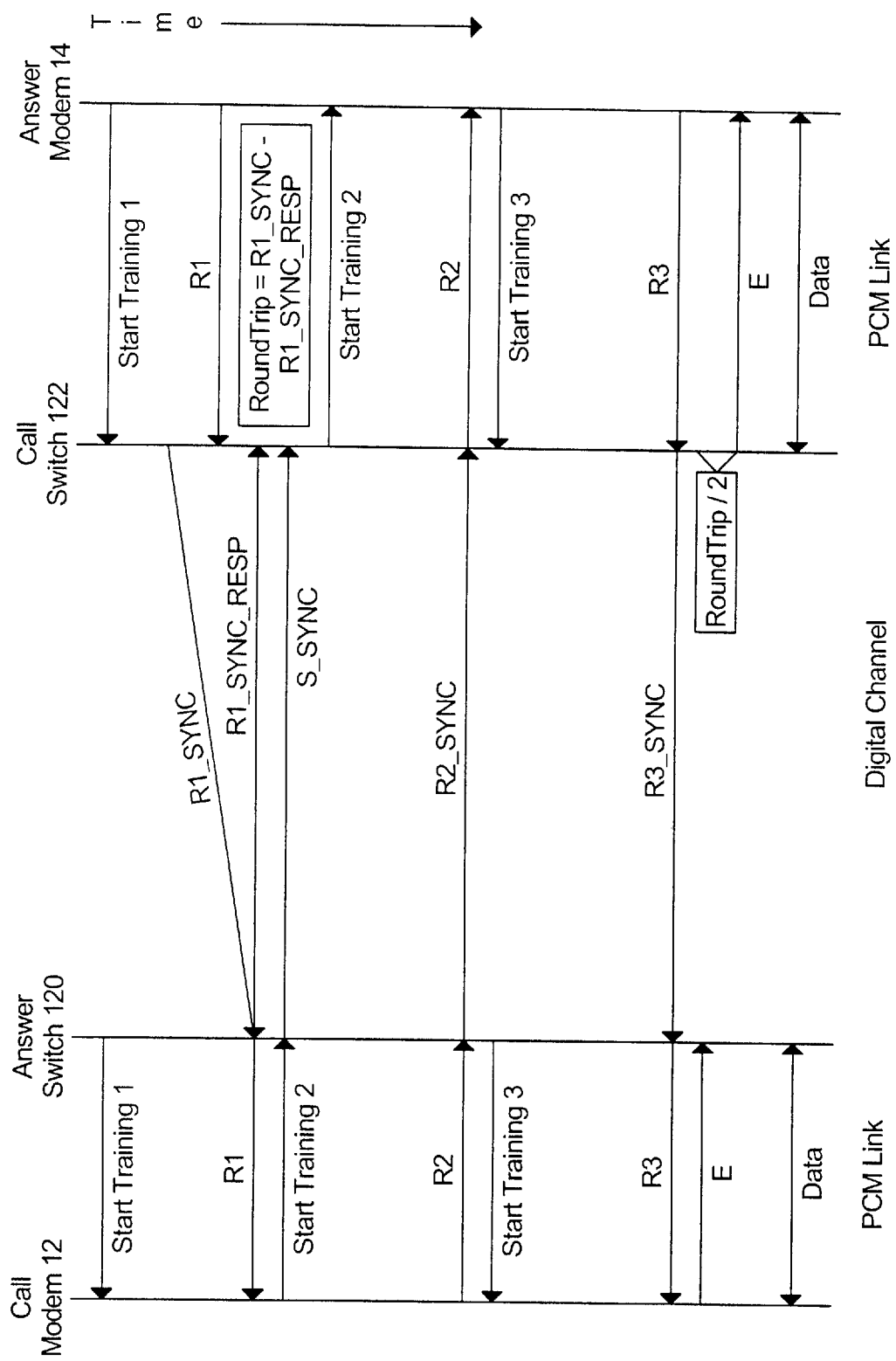
FIG. 8 is a timing diagram of control signals used in the communication system of FIG. 2 during a training and bit rate negotiation process.
Figure 9:
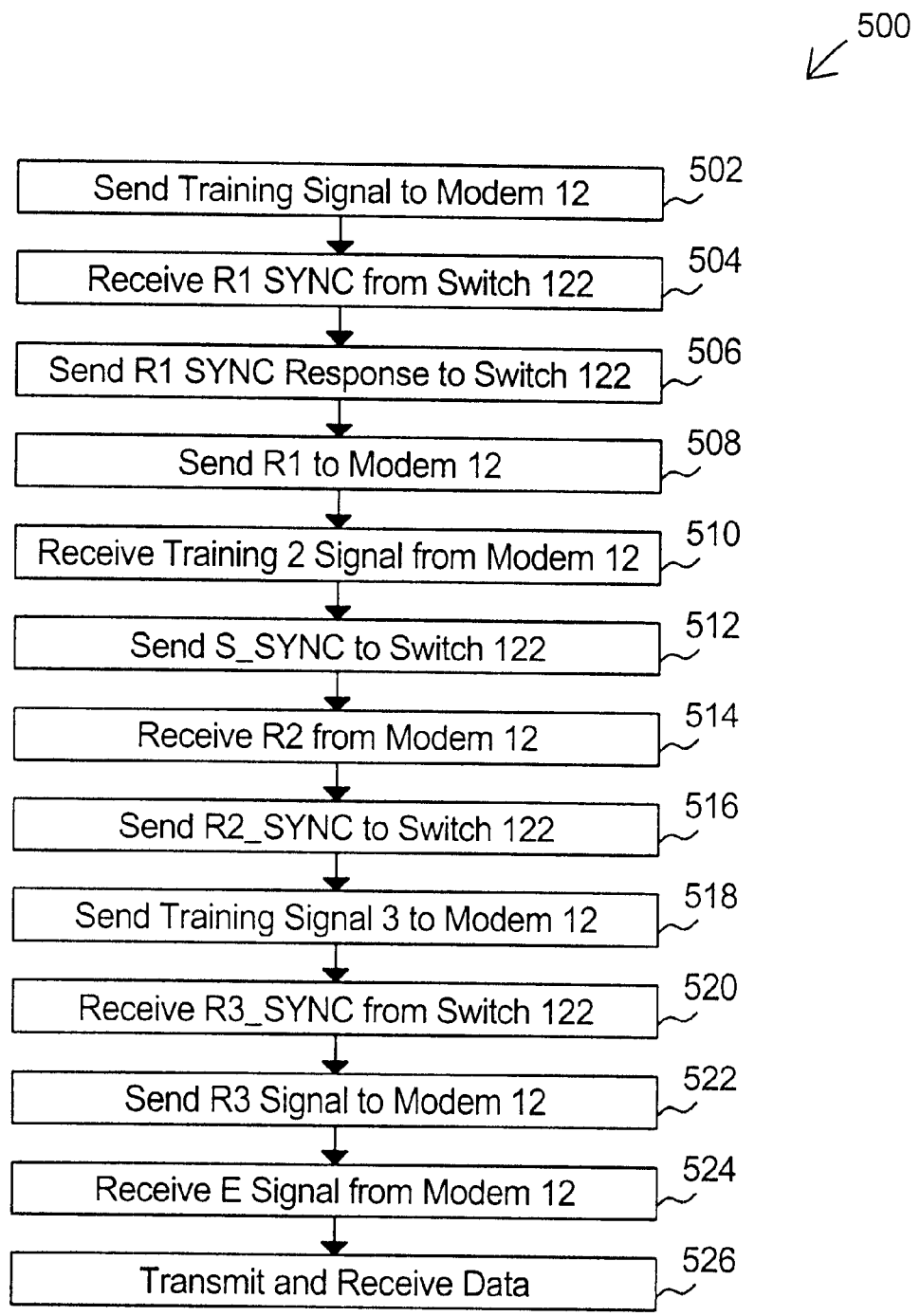
FIG. 9 is a flow chart of a process performed by the first switch during the training and bit negotiation process.
Figure 10:
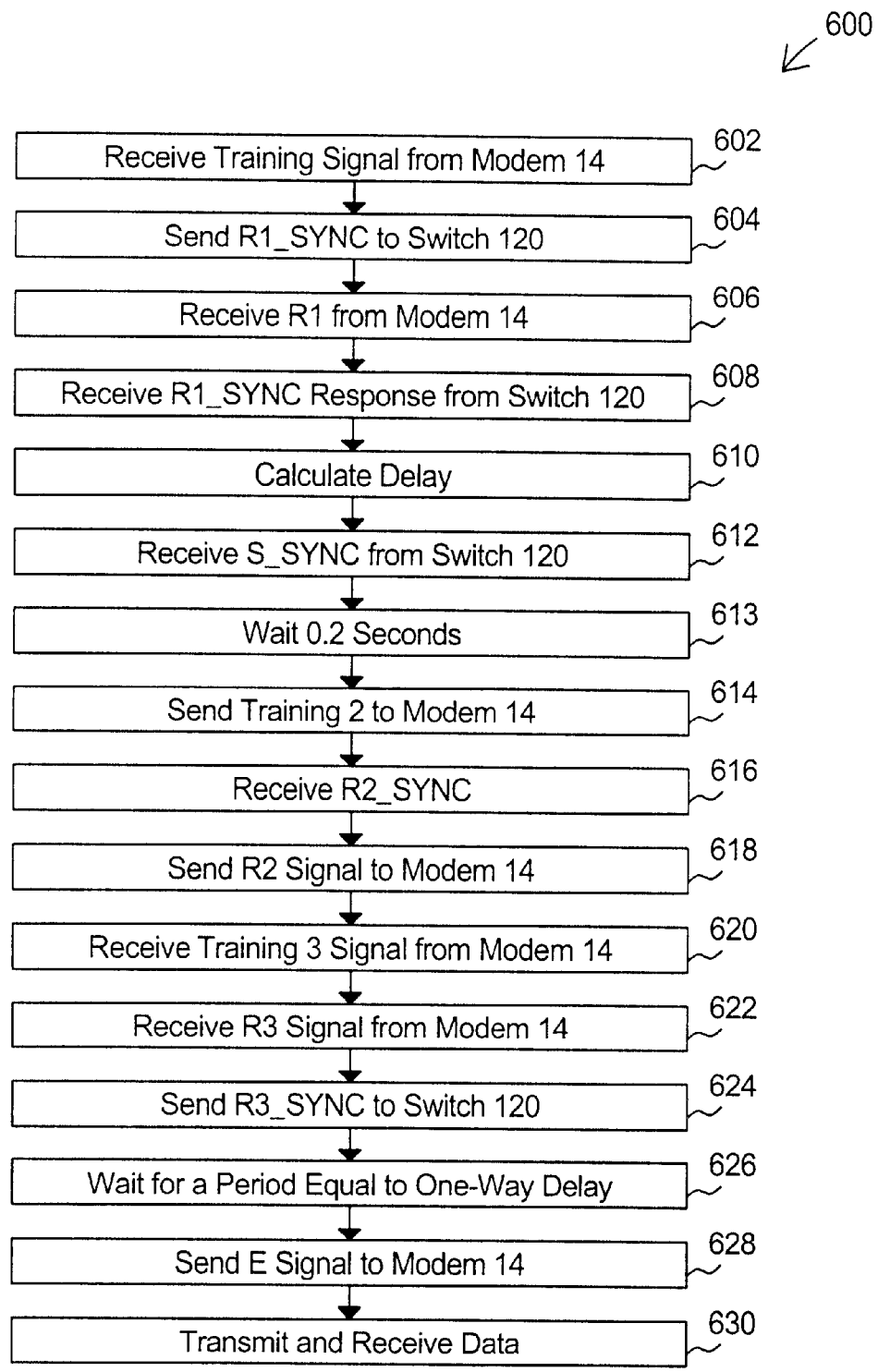
FIG. 10 is a flow chart of a process performed by the second switch during the training and bit negotiation process.

After the modems 12 and 14 have completed the automoding process described above, and the modems 10 and 12 are operating in accordance with the V.32 standard, a training and rate negotiation process is accomplished to train the equalizers in modems 12 and 14 and the equalizers in the modems in switches 120 and 122 and to select a compatible data rate for data transmission between the modems. The V.32bis standard specifies a process for performing training and rate negotiation for two modems coupled together over a dedicated line or a PSTN. However, the process specified in the V.32bis standard does not address modems coupled over a digital channel such as in the communication system 100. In embodiments of the present invention, software contained within each of the switches 120 and 122 allows the modems 12 10 and 14 of communication system 100 to perform training and rate negotiation using the process described in the V.32 standard in such a way that the switches and digital channel are transparent to modems 12 and 14 during the process. This process will now be described with reference to FIGS. 8–10. FIG. 8 shows a timing diagram of the signals between the modems and the switches and FIGS. 9 and 10 show flowcharts of the processes 500 and 600 that occur respectively in switches 120 and 122.

The training period begins immediately after the conclusion of the automoding process discussed above. A training signal is sent by the modem in switch 120 (step 502 of process 500) to modem 12 and by the modem 14 to the modem in switch 122 (step 602 of process 600). Modem 14 receives the confirmation signal after the modem in switch 120, and accordingly, the training signal from modem 14 is sent after the training signal from the modem in switch 120.

Switch 122 sends (step 604) a message R1_SYNC to switch 120 at a time two seconds after it receives the first training signal. The R1_SYNC message is used to attempt to synchronize the rate negotiation process and measure the delay through the digital channel. Upon receipt (step 504) of R1_SYNC, switch 120 sends (step 506) a message R1_SYNC_RESP to switch 122, and the modem in switch 120 sends (step 508) rate signal R1 to modem 12. Rate signal R1, as defined in the V.32bis standard, provides a signal indicative of the data rates available from the modem sending the R1 signal.

After sending message R1_SYNC, switch 122 (in step 606) receives the R1 signal from modem 14. Switch 122 will then receive (in step 608) message R1_SYNC_RESP from switch 120. After receiving message R1_SYNC_RESP, switch 122 calculates (in step 610) the one-way delay through the digital channel by determining the time delay between when it sent message R1_SYNC and when it received message R1_SYNC_RESP, and dividing this delay by two.

Modem 12 responds to signal R1 by sending a second training signal Trn2 to train the modem in switch 120. Upon receipt of the second training signal (step 510), switch 120 (in step 512) sends message S_SYNC across the digital channel to switch 122. Switch 122 receives (step 612) the S_SYNC message and waits 0.2 seconds (step 613) before sending the second training signal Trn2 to modem 14 in step 614. In embodiments of the invention, switch 122 may not start Trn2 signal to modem 14 indicating it has not yet received R1 from modem 14 (even though it may have) to delay the sending of the second training signal until after 0.2 seconds after the receipt of the S_SYNC message from switch 120.

After completing the sending of the second training signal, modem 12 sends to the modem in switch 120 a second rate signal R2 indicating which of the data rates in the R1 signal it can support. Upon receipt (step 514) of the second rate signal, switch 120 sends a signal R2 SYNC to switch 122 (step 516). Signal R2_SYNC includes the rate information contained in signal R2.

Upon receipt (step 616) of the R2_SYNC message, switch 122 sends (step 618) a rate signal R2 to modem 14. The data rates in signal R2 sent by switch 122 include those data rates that can be supported by modem 12, the modem in switch 120, the modem in switch 122 and modem 14.

Upon the receipt of signal R2 by switch 120, switch 120 sends (step 518) a third training signal Trn3 to modem 12. Similarly, upon the receipt of signal R2 by modem 14, modem 14 sends a third training signal which is received (step 620) by the modem in switch 122. The third training signal sent by switch 120 may be delayed by an amount equal to the channel delay calculated above, to attempt to synchronize the sending of the third training signals.

After completing the sending of the third training signal, modem 14 sends a third rate signal indicating the data rate at which data transmission is to occur. Upon receipt (step 622) of the third rate signal R3, switch 122 sends in step 624 message R3_SYNC over the digital channel to switch 120. Message R3_SYNC includes the data rate information contained in signal R3.

Upon receipt (step 520) of message R3_SYNC by switch 120, switch 120, in step 522, sends signal R3 to modem 12. In accordance with the V.32 standard, after receiving signal R3, modem 12 sends a signal E verifying the data rate. Upon receipt of signal E (step 524), the modem in switch 120 sets its data rate to the value indicated by signal E.

In step 626, to approximately synchronize the transmission of the E signals, switch 122 waits a period of time equal to the digital channel delay before setting its data rate to the value indicated by signal R3 and sending (in step 628) signal E to modem 14. In accordance with the V.32bis standard, data transmission (steps 526 and 630) begins a predetermined period of time after the sending of the E signals.

The synchronization of the E signals is used to approximately synchronize the start of the transmission of data for both local connect modem pairs. In embodiments of the present invention it is important that these local connects occur in close absolute time and preferably within 100 ms of each other. Any difference in connect times, combined with delays associated with the digital channel, may violate minimum timeout limits for upper level protocols such as LAPM, MNP(X) and V.42bis. After the connection is established, handshaking for these protocols occurs transparently through switches 120 and 122.

In embodiments of the present invention, during the transfer of data between modems 12 and 14, either modem 12 or 14 may initiate a retrain procedure upon detection of unsatisfactory signal reception as specified in the V.32bis standard. Upon initiation of a retrain procedure by either modem 12 or 14, the switch 120 or 122 coupled to the modem initiating a retrain procedure sends a retrain signal across the digital channel to notify the other switch and the other modem of the retrain procedure. The training and rate negotiation procedure discussed above is then repeated.

In embodiments of the present invention described above, flowcharts have been provided to describe the process performed by each of switches 120 and 122 during automoding, training, bit rate negotiation, retraining and renegotiation. For the description of each of these processes, switch 120 has been coupled to the "call" modem and switch 122 has been coupled to the "answer" modem. Accordingly, the specific functions performed by each of switches 120 and 122 has been different. However, as understood by those skilled in the art, in embodiments of the present invention, each of the switches contains full functionality to support connection to either a "call" modem or an "answer" modem.

In embodiments of the present invention discussed above, modems 12 and 14 are coupled together over a digital link. As understood by those skilled in the art, embodiments of the present invention are not limited to the use of a single digital link between the modems, but also may be extended to communication systems that utilize two or more digital links in tandem.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. An apparatus used in a system for providing communication over a digital channel to couple a first modem on a first network to a second modem on a second network, the apparatus comprising:

a modem module that couples to the first modem over the first network, the modem module providing data to the first modem at a data rate determined in part by a modulation rate of the modem module;

a digital channel interface module coupled to the modem module, the digital channel interface module including a buffer that receives data from the digital channel and provides data to the modem module; and a control circuit coupled to the buffer and the modem module, the control circuit being constructed and arranged to detect a level of data in the buffer and to modify the modulation rate of the modem module based on the level of data detected;

wherein the apparatus is a first apparatus and the digital channel is coupled to a second apparatus, and the digital channel interface module is constructed and arranged to communicate with the second apparatus over the digital channel; and wherein the modem module is adapted to receive automoding signals from the first modem and to transfer the automoding signals to the digital channel interface module, and wherein the digital channel interface module is adapted to send data corresponding to the automoding signal to the second apparatus over the digital channel.

2. The apparatus of claim 1, wherein the digital channel interface module is adapted to receive automoding signals from the other apparatus over the digital channel and to transfer the automoding signals to the modem interface module, and wherein the modem module is adapted to send data corresponding to the automoding signals to the first modem.

3. The apparatus of claim 2, wherein the modem module is adapted to receive rate renegotiation signals from the first modem and to transfer the rate renegotiation signals to the digital channel interface module, and wherein the digital channel interface module is adapted to send data corresponding to the rate renegotiation signals to the second apparatus over the digital channel.

4. The apparatus of claim 3, wherein the digital channel interface module is adapted to receive rate renegotiation signals from the other apparatus over the digital channel and to transfer the rate renegotiation signals to the modem module, and wherein the modem module is adapted to send data corresponding to the rate renegotiation signals to the first modem.

5. The apparatus of claim 4, wherein the first network is a public switched telephone network, and the modem module is constructed and arranged to communicate with the first modem over the public switched telephone network.

6. The apparatus of claim 5, wherein the modem module includes a V.32 modem.

7. An apparatus used in a system for providing communication over a digital channel to couple a first modem on a first network to a second modem on a second network, the apparatus comprising:

a modem module that couples to the first modem over the first network, the modem module providing data to the first modem at a data rate determined in part by a modulation rate of the modem module;

a digital channel interface module coupled to the modem module, the digital channel interface module including a buffer that receives data from the digital channel and provides data to the modem module; and a control circuit coupled to the buffer and the modem module, the control circuit being constructed and arranged to detect a level of data in the buffer and to modify the modulation rate of the modem module based on the level of data detected;

wherein the apparatus is a first apparatus and the digital channel is coupled to a second apparatus, and the digital channel interface module is constructed and arranged to communicate with the second apparatus over the digital channel; and wherein the modem module is adapted to receive rate renegotiation signals from the first modem and to transfer the rate renegotiation signals to the digital channel interface module, and wherein the digital channel interface module is adapted to send data corresponding to the rate renegotiation signals to the second apparatus over the digital channel.

8. The apparatus of claim 7, wherein the digital channel interface module is adapted to receive rate renegotiation signals from the other apparatus over the digital channel and to transfer the rate renegotiation signals to the modem module, and wherein the modem module is adapted to send data corresponding to the rate renegotiation signals to the first modem.

9. An apparatus used in a system for providing communication over a digital channel to couple a first modem on a first network to a second modem on a second network, the apparatus comprising:

first means for operatively coupling to the first modem over the first network to provide a data signal having a data modulation rate to the first modem;

second means for transmitting data to and for receiving data from the digital channel, data storage means for storing data received from the digital channel; and control means, coupled to the first means, the second means and the data storage means, for detecting a level of data in the data storage means and for modifying the modulation rate based on the level of data detected;

wherein the first means includes means for receiving automoding signals from the first modem, and means for transferring the automoding signals to the second means, and wherein the second means includes means for sending data corresponding to the automoding signals to a second apparatus over the digital channel.

10. The apparatus of claim 9, wherein the second means includes means for receiving automoding signals from the second apparatus over the digital channel and means for transferring the automoding signals to the first means, and wherein the first means includes means for sending data corresponding to the automoding signals to the first modem.

11. The apparatus of claim 10, wherein the first means includes means for receiving rate renegotiation signals from the first modem and means for transferring the rate renegotiation signals to the second means, and wherein the second means includes means for sending data corresponding to the rate renegotiation signals to the second apparatus over the digital channel.

12. The apparatus of claim 11, wherein the second means includes means for receiving rate renegotiation signals from the second apparatus over the digital channel and means for transferring the rate renegotiation signals to the first means, and wherein the first means includes means for sending data corresponding to the rate renegotiation signals to the first modem.

13. An apparatus used in a system for providing communication over a digital channel to couple a first modem on a first network to a second modem on a second network, the apparatus comprising:

first means for operatively coupling to the first modem over the first network to provide a data signal having a data modulation rate to the first modem;

second means for transmitting data to and for receiving data from the digital channel, data storage means for storing data received from the digital channel; and control means, coupled to the first means, the second means and the data storage means, for detecting a level of data in the data storage means and for modifying the modulation rate based on the level of data detected;

wherein the first means includes means for receiving rate renegotiation signals from the first modem and means for transferring the rate renegotiation signals to the second means, and wherein the second means includes means for sending data corresponding to the rate renegotiation signals to a second apparatus over the digital channel.

14. The apparatus of claim 13, wherein the second means includes means for receiving rate renegotiation signals from the second apparatus over the digital channel and means for transferring the rate renegotiation signals to the first means, and wherein the first means includes means for sending data corresponding to the rate renegotiation signals to the first modem.

15. An apparatus used in a system for providing communication over a digital channel to couple a first modem on a first network to a second modem on a second network, the apparatus comprising:

first means for operatively coupling to the first modem over the first network to provide a data signal having a data modulation rate to the first modem;

second means for transmitting data to and for receiving data from the digital channel; data storage means for storing data received from the digital channel and control means, coupled to the first means, the second means and the data storage means, for controlling operation of the apparatus;

wherein the first means includes means for receiving automoding signals from the first modem, and means for transferring the automoding signals to the second means, and wherein the second means includes means for sending data corresponding to the automoding signals to a second apparatus over the digital channel.

16. The apparatus of claim 15, wherein the second means includes means for receiving automoding signals from the second apparatus over the digital channel and means for transferring the automoding signals to the first means, and wherein the first means includes means for sending data corresponding to the automoding signals to the first modem.

17. The apparatus of claim 15, wherein the first means includes means for receiving rate renegotiation signals from the first modem and means for transferring the rate renegotiation signals to the second means, and wherein the second means includes means for sending data corresponding to the rate renegotiation signals to a second apparatus over the digital channel.

18. The apparatus of claim 17, wherein the second means includes means for receiving rate renegotiation signals from the second apparatus over the digital channel and means for transferring the rate renegotiation signals to the first means, and wherein the first means includes means for sending data corresponding to the rate renegotiation signals to the first modem.

19. An apparatus used in a system for providing communication over a digital channel to couple a first modem on a first network to a second modem on a second network, the apparatus comprising:

first means for operatively coupling to the first modem over the first network to provide a data signal having a data modulation rate to the first modem;

second means for transmitting data to and for receiving data from the digital channel; data storage means for storing data received from the digital channel and control means, coupled to the first means, the second means and the data storage means, for controlling operation of the apparatus;

wherein the first means includes means for receiving rate renegotiation signals from the first modem and means for transferring the rate renegotiation signals to the second means, and wherein the second means includes means for sending data corresponding to the rate renegotiation signals to a second apparatus over the digital channel.

20. The apparatus of claim 19, wherein the second means includes means for receiving rate renegotiation signals from the second apparatus over the digital channel and means for transferring the rate renegotiation signals to the first means, and wherein the first means includes means for sending data corresponding to the rate renegotiation signals to the first modem.

21. A method for establishing data transmission between a first modem and a second modem over a transmission path that includes a first switch, a second switch, a digital channel coupled between the first switch and the second switch, a first network coupled between the first modem and the first switch and a second network coupled between the second switch and the second modem, the method including steps of:

transmitting a first automoding signal in accordance with a predefined protocol from the second modem to the second switch;

transmitting a signal representative of the first automoding signal from the second switch to the first switch over the digital channel; and transmitting the first automoding signal from the first switch to the first modem;

wherein the first automoding signal includes data representative of data transmission modes supported by the second modem.

22. The method of claim 21, further comprising a step of transmitting a second automoding signal from the first modem to the first switch, wherein the second automoding signal include s data representative of data transmission modes supported by the first modem.

23. The method of claim 22, further comprising a step of transmitting data between the first modem and the second modem over the transmission path using a data transmission mode identified by both the first automoding signal and the second automoding signal.

24. The method of claim 21, further comprising steps of: transmitting a first rate renegotiation signal from the first modem to the second modem over the transmission path; performing a rate renegotiation process to establish a transmission data rate for data transmission between the first modem and the second modem.

\* \* \* \* \*